Figure 1:
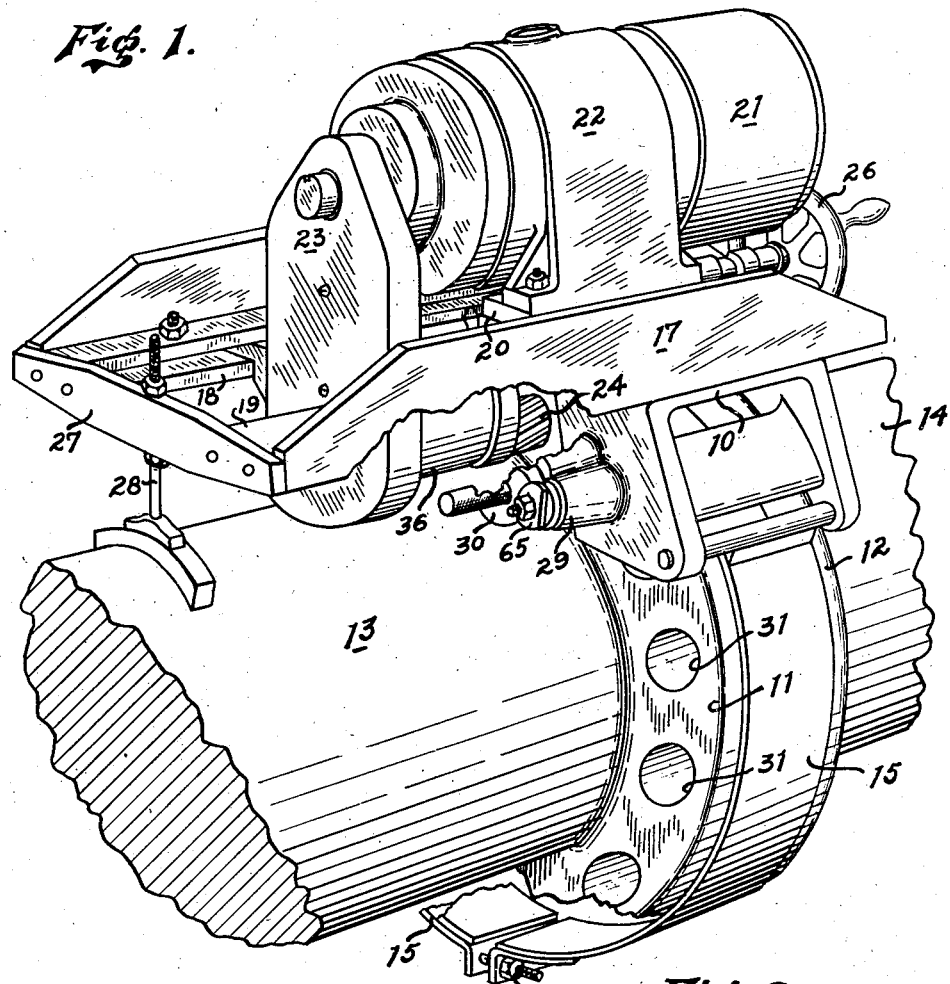

Jan. 30, 1945.   D. R. KING   2,368,476
REAMING TOOL
Filed Feb. 14, 1944   2 Sheets-Sheet 1

INVENTOR.
DONALD R. KING.
BY
*Wm. H. Atkinson*
ATTORNEY

Jan. 30, 1945. D. R. KING 2,368,476
REAMING TOOL
Filed Feb. 14, 1944 2 Sheets-Sheet 2
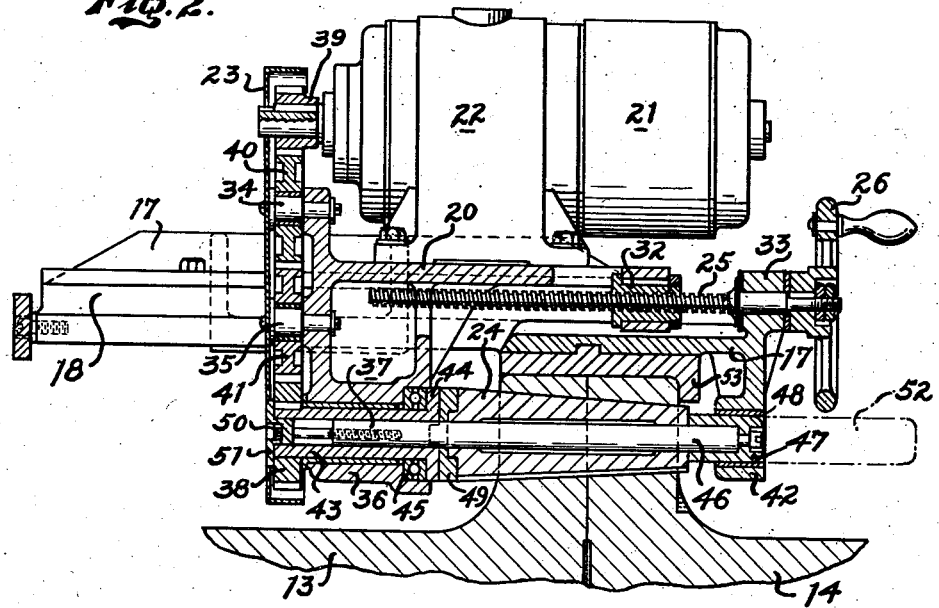
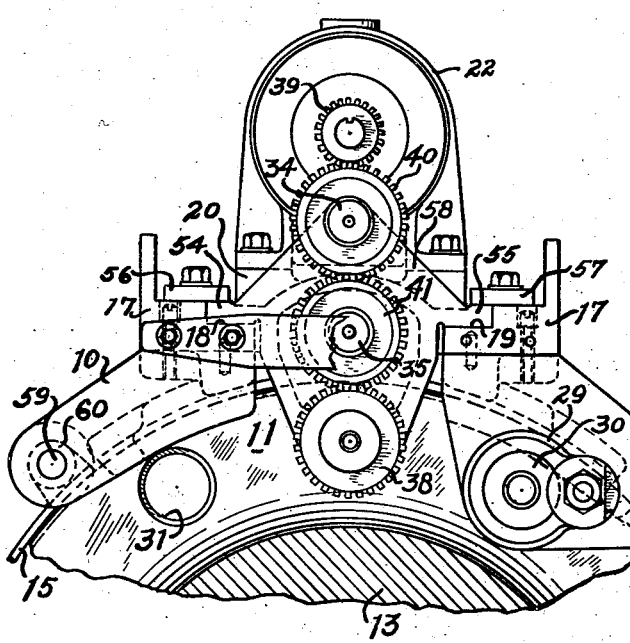
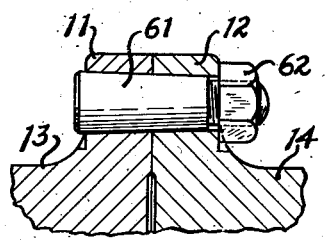
INVENTOR.
DONALD R. KING.
BY
*Wm. H. Atkinson.*
ATTORNEY Patented Jan. 30, 1945

2,368,476

UNITED STATES PATENT OFFICE 2,368,476

REAMING TOOL

Donald R. King, Sunnyvale, Calif., assignor to Joshua Hendy Iron Works, Sunnyvale, Calif., a corporation of Nevada Application February 14, 1944, Serial No. 522,213

5 Claims. (Cl. 77—2)

My present invention relates to a machine for reaming holes, and more particularly to a portable type of machine which may be conveniently moved from one job to another and mounted upon the work in various positions as will be determined by the work to be done.

An object of the invention is to provide a novel machine of portable character which may be secured upon a piece of work and operated in various positions to effect a true and accurate reaming of holes in the work.

Another object of the invention is to provide a new and novel machine which will be found particularly applicable to the formation of tapering holes in the cooperating flanges of a shaft or like coupling by a single reaming operation.

A further object of the invention is to provide a novel means for mounting and securing a reaming tool of the character contemplated by the invention upon the work in a simple, effective and convenient manner.

In the past, the bolt or pin holes of the coupling flanges of two adjacent shaft sections have generally been drilled and reamed separately upon a large machine at the point of manufacture, but with this practice it has often happened that the flange holes do not come into accurate alignment when the flanges are assembled. It is therefore another object of the invention to provide a machine by which these holes may be reamed after the shaft sections have been installed on a job.

More recently it has become the practice to also use tapered pins instead of bolts for securing the sections of a propeller shaft together and for this it has been found desirable to ream the holes of the adjacent flanges after the shaft sections have been installed in the shaft tunnel of a ship, and it is therefore a further object of the invention to provide a reaming tool that may be mounted and secured upon the cooperating flanges of two shaft sections within a relatively confined space and operated to simultaneously ream the aligned pin receiving holes in an efficient and effective manner.

Other objects and advantages of the invention will be in part evident to those skilled in the art and in part pointed out hereinafter in the following description taken in connection with the accompanying drawings wherein there is shown by way of illustration and not of limitation, a preferred embodiment thereof.

In the drawings:

Figure 1 is a perspective view with parts broken away, showing a tool constructed in accordance with the invention and applied to the cooperating flanges of a ship propeller shaft.

Figure 5:
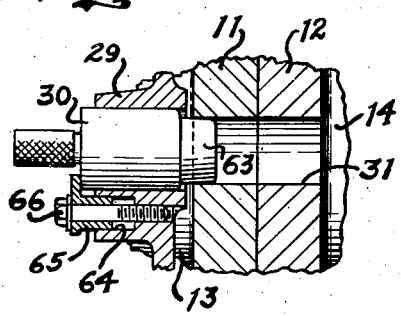
Figure 6:
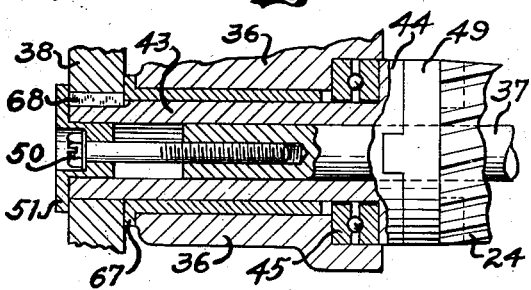

Figure 2 is a side elevation partially in section, taken along the longitudinal axis of two shaft sections, Figure 3 is an end elevation looking toward the right at Figure 2 of the drawings, Figure 4 is a fragmentary view showing the use of a tapered pin as a securing means for the adjacent flanges of two shaft sections, Figure 5 is a fragmentary sectional view showing a detail of the invention, and Figure 6 is a sectional view showing other details of the invention.

For the purpose of this description there is illustrated, in Figure 1 of the drawings, a machine constructed in accordance with a preferred embodiment of the invention. In this embodiment the tool or machine is shown as comprising a saddle-like member 10 having a curved under surface that conforms to the cylindrical contour of the peripheries of two juxtapositioned shaft flanges 11 and 12 against which it is adapted to be secured. These adjacent flanges 11 and 12 are formed upon the meeting ends of two sections 13 and 14 of a ship's propeller shaft and the saddle-like member 10 is secured thereupon by means of a flexible clamping band or strap 15. This flexible clamping band or strap 15 extends from the sides of the saddle-like member 10 and around the flanges 11 and 12 and has a threaded means 16, which when tightened will exert a clamping force and thus secure the saddle-like member 10 in a fixed position upon the flanges 11 and 12. Mounted upon the saddle-like member 10 and extending parallel to the axis of the shaft sections 13 and 14 there is a bedplate 17 which carries two oppositely positioned and parallel guide rails 18 and 19 along which a tool carriage 20 is adapted to move longitudinally of shaft sections 13 and 14. Mounted upon the tool carriage 20 and movable therewith there is an electric motor or power unit 21 that operates through a speed reduction gear 22 and a gear train, here concealed by a guard or cover 23, to drive a hole reaming tool 24 that is also movable with the tool carriage 20. As will hereinafter appear the bedplate 17 is also provided with a lead screw 25, not here exposed to view, that is adapted when turned by means of a hand wheel 26 to move the tool carriage 20 together with the power unit 21 and the reamer 24 longitudinally with respect to the shaft sections 13 and 14. At this point it will be noted that the guide rails 18 and 19 of the bedplate 17 extend outwardly over the shaft section 13 at one side of the flange 11 and therefore in order to prevent any tipping of the bedplate with respect to the flanges 11 and 12 and to also avoid any unnecessary strain upon the flexible strap or clamping band 15, when the reamer 24 is withdrawn from the work, the ends of the guide rails 18 and 19 are also shown as having a connecting brace 27 that carries an adjustable support or jack 28 which when properly adjusted will serve in cooperation with the clamping band 15 to support the guide rails 18 and 19 of the bedplate 17 in parallel relation with the axis of the shaft sections 13 and 14. As an additional feature, this figure of the drawings also shows the saddle-like member 16 as having a boss-like extension 29 through which a plug or gauge member 30 is adapted to be projected into register with an adjacent hole in the flange 11. In this way the saddle-like member 10 will be located and held upon the flanges 11 and 12 in proper radial relation to the particular hole being reamed.

Upon now referring to Figure 2 of the drawings, it will be noted that the lead screw 25, previously referred to, is journaled in an upwardly disposed bearing 33 formed at one end of the bedplate 17 and that the tool carriage 20 is connected thereto by means of a threaded head or nut 32 through which the lead screw is threaded. It will also be noted that at its other end the tool carriage 20 has end flanges or brackets upon which two spaced stub shafts 34 and 35 are mounted. Below these flanges or brackets the tool carriage 20 also carries a headstock 36 in which a mandrel, designated generally by the numeral 37, is mounted. The mandrel 37 is here shown as carrying a gear 38 that is connected in driving relation to a pinion 39, at the output end of the speed reduction gear 27, through a gear train formed by intermediately disposed gears 40 and 41 which are journaled respectively upon the stub shafts 34 and 35. In the preferred arrangement it is contemplated that the driving motor 21 will have a speed of approximately 1500 R. P. M., and that the gear reduction device will have a ratio of 30/1 and as a result the pinion 39 will operate at a speed of approximately 50 R. P. M. In this instance the pinion 39 is shown as having a pitch diameter equal to one-half the pitch diameter of the gear 38 and therefore the mandrel 37 with the reamer 24 will be driven at a speed of approximately 25 R. P. M. At this point will be noted that the headstock 36 is positioned over the shaft section 13 and at one side of the shaft flange 11. It will be also seen that the bedplate 17 has a depending portion which forms a guide or tailstock 42 at the other side of the flange 12 into which the projecting end of the mandrel 37 extends.

The mandrel designated above generally by the numeral 37 may be described in more detail as comprising a cylindrical sleeve 43 that is journaled within the headstock 36 and upon the end of which the driving gear 38 is keyed. At its other end the sleeve 43 has a flange forming collar 44 which is adapted to abut against an annular thrust resisting ball-race 45 that is also carried by the headstock 36. Extending through the mandrel sleeve 43 there is a tierod 46 upon which the reamer 24 is mounted. At its outer end this tierod 46 carries an enlarged head 47 which is journaled within a bushing 48 carried by the tailstock 42 when the reamer 24 is in operation. As a means for establishing a driving connection between the reamer 24 and the mandrel sleeve 43 there is keying member 49 which has oppositely extending portions that project into radial key slots formed in the opposed faces of the reamer 24 and the flange forming collar 44 upon the mandrel sleeve 43. In this particular device the tierod 46 is tensioned by means of a threaded bolt 50 which cooperates with a recessed member 51 at the open end of the sleeve 43. With this arrangement it will be understood that when the threaded bolt 50 is tightened the enlarged head 47 at the outer end of the tierod 46 will be drawn into clamping relation with the small end of the reamer 24 and thus the reamer will be held in splined engagement with the gear driven mandrel sleeve 43 through the medium of the keying member 49. At this point it should be explained that the reamer 24, as here illustrated, is of the finishing type and therefore it will not be required to effect any cutting or reaming operation until the enlarged head 47 at the outer end of the tierod 46 has entered the tailstock 42. In other words, the particular mandrel assembly here shown is used only after the aligned holes of the flanges 11 and 12 have been roughly reamed by a so-called porcupine reamer which will be clamped upon the tierod 46 with an enlarged head 52, here shown by dot and dash lines, which will be of a length sufficient to engage the tailstock 42 before the small end of the routing reamer enters the unreamed hole 31 of the flange 11. Before proceeding with the description of the remaining figures of the drawings, it should be here noted that the saddle-like member 10 has a downwardly depending lip 53 which is adapted to engage the side of the flange 12 immediately above the reamer 24 and thus provide a bearing point against which the thrust occasioned by a feeding of the reamer 24 into the holes 31 may react.

As is more clearly shown in Figure 3 of the drawings the saddle-like member 10 is of a substantially arcuate configuration with a flat surface at its upper side upon which the bedplate 17 is bolted and pinned as an integral unit. As here shown the trackways or guide rails 18 and 19 of the bedplate 17 are respectively engaged by outwardly extending pads or feet 54 and 55 formed upon the tool carriage 20 which are held against upward displacement by means of clamping plates 56 and 57. In this view it will also be noted that the stub shaft 34 is carried by an upwardly extending bracket 58 and the stub shaft 35 is mounted upon a web of the casting which forms the tool carriage 20. It will be also here noted that the sides of the saddle-like member 10 are provided with axially extending pins 59 that extend through clevis-like members 60 which are welded to the adjacent ends of the clamping band or strap 15.

In Figure 4 of the drawings, there is shown in section, a shaft assembly of the type contemplated by the invention, in which the tapered pins 61 are extended through the reamed holes 31 of the flanges 11 and 12, and are there secured by the application of threaded nuts 62 which are tightened to produce a uniform shearing stress upon all of the tapered pins 61 of the shaft coupling so formed.

Reference is now made to Figure 5 of the drawings which shows in detail the reamer positioning or gauge feature briefly described above in connection with Fig. 1 of the drawings. As here shown the boss-like extension 29 forms a close fitting cylindrical receptacle into which the plug or gauging member 30 is adapted to slide freely. At its inner end the gauge member 30 has a reduced and slightly tapered extension 63 that is adapted to register with and extend into an adjacent hole 31 in the flange 11 of the shaft coupling. To facilitate the convenient use of the gauging member 30 and to hold it in place while the machine is in operation the boss 29 also has an adjacent cylindrical recess 64 into which a cylindrical and mutilated flange carrying member 65 is held by means of a bolt 66. With this arrangement when the mutilated flange of the member 65 is turned into one position the gauge member 30 will be held in the position here illustrated and when this flange is turned around to bring its mutilated portion adjacent the gauge member 30 it will permit the free removal of the gauge member 30 from its cylindrical receptacle in the boss 29. This will permit a shifting of the saddle 10 to a new position where the reamer 24 may operate upon the next succeeding hole 31. In this particular showing the gauge member 30 is of the type which will be used when first positioning the ream 24 with respect to an unreamed hole. It will therefore be understood that when the saddle 10 is positioned upon shaft flanges 11 and 12 at a point where the engaging member 30 will engage a reamed hole 31, the gauge member 30 will be of a type having a longer and tapered extension 63 that will extend into each of the flanges 11 and 12 and also conform to the taper of the entire hole 31 and as a result the flanges 11 and 12 will be held in perfect register during all of the subsequent reaming operations.

Upon now referring to Figure 6 of the drawings it will be noted that the mandrel sleeve 43 is journaled within the headstock forming portion 36 of the tool carriage 20 by means of a bearing bushing 67 and that the thrust exerted thereupon by a feeding of the reamer 24 into the work will be taken by the ball-race 45. In this view it will also be noted that the gear 38 is secured upon the projecting end of the mandrel sleeve 43 by a conventional key 68.

It is believed that the operation of my invention will be evident from the above. However, it may be added that in the starting of any particular job, the shaft sections 13 and 14 will first be positioned with the holes 31 of their flanges 11 and 12 substantially in register. This may be done at the factory with proper supporting means for the shaft sections 13 and 14 or it may be accomplished when the shaft sections are installed at their point of ultimate use. After the shaft sections 13 and 14 have been thus arranged the saddle 10 will be placed thereupon and secured by means of the clamping flexible band or strap 15 so that the reamer 24 will be in alignment with the uppermost hole in the flanges 11 and 12. At this point it may be stated that the gauging member 30 will be brought into register with an adjacent unreamed hole 31 so as to properly position the reamer 24 with respect to an adjacent hole prior to the final securing of the saddle 10 upon the flanges. At the same time the adjustable support or jack 28 at the outer end of the guide rails 18 and 19 will be adjusted so as to avoid any tipping strain upon the clamping band 50 when the tool carriage 20 is positioned outwardly thereupon as will be the case at the beginning of a reaming operation. After the reamer 24 has been thus aligned with respect to a hole to be reamed and the saddle 10 is firmly secured upon the flanges 11 and 12 the operator after starting the electric motor or power unit 21, may feed the reamer 24 into the hole and complete the reaming operation by a turning of the handwheel 26 in a direction which will move the tool carriage 20 along the guide rails 18 and 19 in a reamer feeding direction. After the hole has been reamed the handwheel will be turned in a reverse direction to remove the reamer from the hole. Then the flexible clamping band 15 will be released and with the gauging member 30 withdrawn the saddle 10 can be moved around the flanges 11 and 12 to a second position where the reamer 24 will align with the next hole 31. During this latter operation it will also be desirable to turn the shaft sections 13 and 14 so as to position the tool carriage substantially centrally above the shaft sections 13 and 14. In this manner it will be possible to successively ream all of the holes 31 of the flanges.

While I have, for the sake of clearness and in order to disclose the invention so that the same can be readily understood, described and illustrated specific devices and arrangements, I desire to have it understood that the invention is not limited to the particular form disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. In a hole reaming fixture, the combination of saddle-like support adapted to be secured upon a cylindrical piece of work, a carriage guide means secured upon said support, a tool carriage movable upon said guide means in a path parallel to the axis of the cylindrical piece of work, a reamer operatively mounted upon said carriage and extendable beneath said saddle-like support and into the work, a power unit mounted upon and movable with said carriage, a driving connection between said power unit and said reamer, a lead-screw means for moving said tool carriage along said guide means to feed said reamer into the work, and a flexible clamping band extending from said saddle-like support and around the work adapted to secure said saddle-like support in any desired radial position about the cylindrical piece of work.

2. In a hole reaming fixture, the combination of a saddle-like support adapted to be secured upon a cylindrical piece of work, a carriage guide means secured upon and extending to one side of said support, a tool carriage movable along said guide means in a path parallel to the axis of the cylindrical piece of work, a reamer operatively mounted upon said carriage and extendable into the work, a power unit mounted upon and movable with said carriage, a driving connection between said power unit and said reamer, means for moving said tool carriage along said guide means and feeding the reamer into the work, a flexible band extending between the sides of said saddle-like support and around the work adapted to secure said saddle-like support in any desired radial position upon the cylindrical piece of work, and means carried by said saddle-like support for holding said reamer in an operative position with respect to an adjacent hole in said work.

3. In a machine for reaming holes in the end of a cylindrical member, the combination of a saddle-like support adapted to be secured upon and adjacent to the end of a cylindrical piece of work, a carriage guide means secured upon and extending outwardly from one side of said support, a tool carriage movable along said guide means in a path parallel to the axis of the cylindrical piece of work, a reamer operatively mounted upon said carriage and extendable beneath said saddle-like support and into the work, a power unit mounted upon and movable with said carriage, a driving connection between said power unit and said reamer, means for moving said tool carriage along said guide means to feed the reamer into the work, a flexible band extending between the sides of said saddle-like support and around the work adapted to secure said saddle-like support in any desired radial position upon the cylindrical piece of work, and means carried by said saddle-like support and engaging a previously reamed hole for securing said saddle-like support against radial displacement during a hole reaming operation.

4. In a machine for simultaneously reaming aligned holes of two juxtapositioned coupling flanges of a shaft or the like, the combination of a saddle-like support, a clamping band extending from the sides of said saddle-like support and around the periphery of said juxtapositioned flanges for securing said saddle-like support upon said flanges, a bedplate carried by said saddle-like support having guide means extending outwardly at one side of said juxtapositioned flanges and a tailstock forming portion extending downwardly therefrom at the other side of said flanges, a carriage mounted upon said bedplate and movable along said guide means in a path parallel to the axis of said shaft, said carriage having a downwardly disposed headstock forming portion positioned in alignment with the tailstock forming portion of said bedplate, a mandrel mounted upon said headstock and extending through said tailstock forming portion and adapted to support and drive a reamer within a hole of said juxtapositioned flange, a power unit mounted upon said carriage and having a driving connection with said mandrel, and means for moving said tool supporting carriage along said guide means to feed a reamer into the aligned holes of said juxtapositioned flanges.

5. In a machine for simultaneously reaming aligned tapered pin receiving holes of two juxtapositioned coupling flanges of a shaft or the like, the combination of a saddle-like support, a clamping band extending from the sides of said saddle-like support and around said juxtapositioned flanges for securing said saddle-like support in peripherial engagement upon said flanges, a bedplate carried by said saddle-like support having guide means extending outwardly at one side of said juxtapositioned flanges and a tailstock forming portion extending downwardly therefrom at the other side of said flanges, a carriage mounted upon said bedplate and movable parallel to the axis of said shaft, said carriage having a downwardly disposed headstock forming portion positioned at one side of said flanges and in axial alignment with said tailstock forming portion at the other side of said juxtapositioned flanges, a mandrel mounted upon said headstock and extending through one of said holes to said tailstock forming portion, a reamer carried by said mandrel, a power unit mounted upon said carriage and having a driving connection with said mandrel, means for moving said tool supporting carriage along said guide means to feed said reamer into the aligned holes of said juxtapositioned flanges, and means carried by said saddle-like support for holding said reamer in a predetermined operative position with respect to a previously reamed hole and prevent radial displacement of said saddle-like support during a reaming operation.

DONALD R. KING.